United States Patent
Rebiffe

(10) Patent No.: US 11,953,814 B2
(45) Date of Patent: Apr. 9, 2024

(54) MOTORIZED BRACKET FOR VIDEO PROJECTOR

(71) Applicant: XYZED, Paris (FR)

(72) Inventor: Maurice Rebiffe, Paris (FR)

(73) Assignee: XYZED, Paris (FR)

( * ) Notice: Subject to any disclaimer, the term of this patent is extended or adjusted under 35 U.S.C. 154(b) by 0 days.

(21) Appl. No.: 17/802,710

(22) PCT Filed: Feb. 24, 2021

(86) PCT No.: PCT/FR2021/050325
§ 371 (c)(1),
(2) Date: Aug. 26, 2022

(87) PCT Pub. No.: WO2021/170958
PCT Pub. Date: Sep. 2, 2021

(65) Prior Publication Data
US 2023/0108928 A1    Apr. 6, 2023

(30) Foreign Application Priority Data
Feb. 27, 2020    (FR) ...................................... 2001934

(51) Int. Cl.
*G03B 21/14*    (2006.01)
*F16M 11/08*    (2006.01)
(Continued)

(52) U.S. Cl.
CPC ........... *G03B 21/145* (2013.01); *F16M 11/08* (2013.01); *F16M 11/18* (2013.01);
(Continued)

(58) Field of Classification Search
CPC ...... G03B 21/145; F16M 11/08; F16M 11/18; F16M 11/2035; F16M 13/022; F16M 13/027; F16M 2200/068; H02K 7/116
See application file for complete search history.

(56) References Cited

U.S. PATENT DOCUMENTS 5,758,955 A    6/1998    Belliveau
6,953,270 B1    10/2005    Richardson
(Continued)

FOREIGN PATENT DOCUMENTS

AU    2010203242 A1 *    3/2011    ........... F16M 11/041
EP    3439153 A1    2/2019
(Continued)

OTHER PUBLICATIONS

Search Report from corresponding French Application No. FR 2001934, dated Nov. 11, 2020.
(Continued)

*Primary Examiner* — Eret C McNichols
(74) *Attorney, Agent, or Firm* — Workman Nydegger

(57) ABSTRACT

A motorized bracket is intended to receive, in a support, a video projector and having a base, a first arm and a second arm. The first arm is connected to the base at a first motorized rotation axis. The second arm is connected to the first arm at a second motorized rotation axis and the second arm is connected to the support at a third motorized rotation axis. The motorized rotation axes each consist of a motor coupled to a geared motor assembly in direct engagement with the arm or the support that is to be controlled.

10 Claims, 5 Drawing Sheets

(51) Int. Cl.
*F16M 11/18* (2006.01)
*F16M 11/20* (2006.01)
*F16M 13/02* (2006.01)
*H02K 7/116* (2006.01)
*H02K 11/00* (2016.01)
*H02K 11/33* (2016.01)

(52) U.S. Cl.
CPC ...... *F16M 11/2035* (2013.01); *F16M 13/022* (2013.01); *F16M 13/027* (2013.01); *H02K 7/116* (2013.01); *H02K 11/0094* (2013.01); *H02K 11/33* (2016.01); *F16M 2200/068* (2013.01)

(56) References Cited

U.S. PATENT DOCUMENTS

| | | | | |
|---|---|---|---|---|
| 9,789,976 | B2 * | 10/2017 | Zhou | H04N 23/6812 |
| 10,240,714 | B2 * | 3/2019 | Wei | G03B 17/561 |
| 10,583,556 | B2 * | 3/2020 | Niemeyer | F16M 13/00 |
| 10,704,732 | B2 * | 7/2020 | Kang | F16M 13/00 |
| 10,745,149 | B2 * | 8/2020 | Sun | F16M 11/2071 |
| 10,788,736 | B2 * | 9/2020 | Wang | F16M 11/041 |
| 10,801,659 | B2 * | 10/2020 | Ma | F16M 11/08 |
| 10,914,418 | B2 * | 2/2021 | Wang | F16M 11/123 |
| 10,976,028 | B1 * | 4/2021 | Todd | H01R 33/94 |
| 11,028,967 | B2 * | 6/2021 | Su | G03B 17/563 |
| 11,060,658 | B2 * | 7/2021 | Griffin | F16M 11/18 |
| 11,137,667 | B2 * | 10/2021 | Huang | G03B 15/006 |
| 11,137,668 | B2 * | 10/2021 | Liwszyc | F16M 13/022 |
| 11,442,343 | B2 * | 9/2022 | Zhao | F16M 11/123 |
| 11,592,138 | B2 * | 2/2023 | Su | F16M 13/02 |
| 11,662,817 | B2 * | 5/2023 | Su | G01C 11/02 700/275 |
| 11,675,260 | B2 * | 6/2023 | Zhang | G09F 19/18 353/87 |
| 2008/0210025 | A1 * | 9/2008 | Goossen | F16M 11/123 74/5.34 |
| 2014/0037278 | A1 * | 2/2014 | Wang | G05D 1/0094 396/55 |
| 2014/0139426 | A1 | 5/2014 | Kryze et al. | |
| 2017/0106998 | A1 * | 4/2017 | Zhou | F16M 11/10 |
| 2017/0227162 | A1 * | 8/2017 | Saika | F16M 11/121 |
| 2017/0261157 | A1 * | 9/2017 | Guo | F16M 11/24 |
| 2017/0301230 | A1 * | 10/2017 | Liu | G03B 17/561 |
| 2018/0335178 | A1 * | 11/2018 | Bin | F16M 11/38 |
| 2019/0120468 | A1 | 4/2019 | Peard | |
| 2019/0316731 | A1 * | 10/2019 | Zhao | F16M 13/00 |
| 2019/0317385 | A1 * | 10/2019 | Zhao | F16M 11/205 |
| 2020/0208816 | A1 | 7/2020 | Peard | |
| 2020/0213518 | A1 * | 7/2020 | Su | G05D 3/12 |
| 2020/0293046 | A1 * | 9/2020 | Liu | G05D 1/101 |
| 2020/0318778 | A1 * | 10/2020 | Liu | F16M 13/02 |
| 2020/0333693 | A1 * | 10/2020 | Tian | F16M 11/123 |
| 2021/0131609 | A1 * | 5/2021 | Zhao | F16M 11/105 |
| 2021/0269172 | A1 * | 9/2021 | Jung | G03B 29/00 |
| 2022/0034446 | A1 * | 2/2022 | Liao | F16M 11/2071 |
| 2022/0082203 | A1 * | 3/2022 | Zhao | F16M 11/041 |
| 2023/0012955 | A1 * | 1/2023 | Ding | G03B 21/28 |
| 2023/0199316 | A1 * | 6/2023 | Tulsi | H04N 5/2224 396/428 |
| 2023/0221117 | A1 * | 7/2023 | Ran | F16M 11/18 33/290 |

FOREIGN PATENT DOCUMENTS

FR 2953583 A1 6/2011
FR 3049690 A1 10/2017

OTHER PUBLICATIONS

International Search Report from PCT Application No. PCT/FR2021/050325, dated May 31, 2021.

* cited by examiner

MOTORIZED BRACKET FOR VIDEO PROJECTOR

TECHNICAL FIELD

The present invention relates to the field of image projection and concerns, in particular, a motorized bracket for LED or laser video projectors.

PRIOR ART

In the past, cinema or video projectors conventionally consisted of an incandescent lamp or a xenon-type discharge lamp or a metal halide lamp HMI (Hydrargyrum medium-arc iodide lamp), and a reflector for orienting the light beam coming from this lamp towards an optical system comprising one or more lenses arranged in the light beam. In scene or show projectors, various shutters were also placed at the outlet of the optical system in order to ensure the production of special effects, for example a cutting knife, a colour wheel, an iris and a gobo wheel.

However, for several years now, medium or high-power projectors have appeared on the image projection market, in particular for video, the light sources of which, intended to replace these discharge or incandescent lamps, consist of LEDs or laser diodes. Unfortunately, these video projectors are heavy (of order 50 to 200 kg), large-volume (of order m3) and very noisy. These are one-piece projectors, the light source being associated with the video motor (or video head), of the LCD (liquid-crystal), LCOS (liquid crystal on silicon) or DLP (digital light processor) type for example, the servo-control system of which is also relatively complex. The motorized bracket receiving the video projector must therefore accept such a weight and volume, which leads to an unwieldy assembly and a source of very large constraints (attachment, stabilisation, repositioning precision, repeatability of movement, absence of vibration, etc.) so as to considerably limit the use which can be made of such a video projector.

DISCLOSURE OF THE INVENTION

The present invention proposes overcoming these constraints with a video projector that is lighter, less bulky, less noisy and the maneuverability of which, in other words the amplitude, the precision of movements and the speed of movement, are greatly increased. Another object of the invention is to reduce the current complexity of the servo control of this video projector.

These objects are achieved by a motorized bracket intended to receive, in a support, a video projector and having a base, a first arm and a second arm, characterised in that the first arm is connected to the base at a first motorized rotation axis, the second arm being connected to the first arm at a second motorized rotation axis and the second arm is connected to the support at a third motorized rotation axis, the motorized rotation axes each consisting of a motor coupled to a geared motor assembly in direct engagement with the arm or the support that is to be controlled.

Thus the direct-axis motorisation allows excellent precision whatever the direction of rotation of the motor and the incorporation of a third rotation axis, compared with conventional two-axis motorized brackets, enables the management of a complementary adjustment parameter which does not exist in the solutions of the prior art and relating to the positioning of the image in "portrait" mode or in "landscape" mode.

The motors are preferably stepper motors or brushless DC motors and the geared motor assemblies in direct engagement are elliptical reduction gears with very low hysteresis, typically less than 0.5 Arcmin.

According to the envisaged embodiment, the first and second arms have an "L" shape or a "U" shape. In this second case, the first and second arms are, in addition, connected via a single free rotation axis that is coaxial with the second motorized rotation axis.

The support preferably comprises an electrical connector intended to be connected to the video projector in order to ensure the supply of power and the control of motors of the video projector from the control unit according to a daisy chain.

Advantageously, the base comprises an AC/DC converter, a battery and a control unit delivering on a power line, the energy necessary for the power supply of the various motors of the bracket and of the video projector and, on a common data line, position data required in order to control the rotation of the various motors of the bracket and the video projector.

Preferably, each of the motors comprises its own control card equipped with a microprocessor or microcontroller (comprising a static RAM memory, flash memory or electrically programmable ROM memory) locally managing the rotation position data of the associated motor received on the common data line, according to its own preprogramed servo-control law, each control card having a code wheel allowing a specific motor to be identified.

Advantageously each of the control cards is configured to maintain from the battery and in all circumstances, a minimum supply voltage necessary for saving the position of each of the motors of the bracket, in standby mode and when switched off.

The invention also relates to an assembly comprising a video projector and a motorized bracket as described above.

BRIEF DESCRIPTION OF THE FIGURES

Other features and advantages of the present invention will become apparent from the description given below, with reference to the appended drawings which illustrate an exemplary embodiment that is in no way limiting and wherein.

DESCRIPTION OF THE EMBODIMENTS

Figure 1:
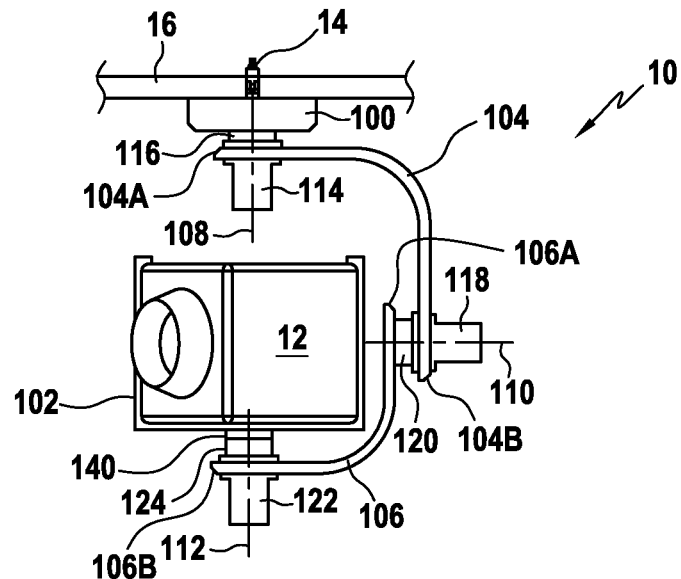
FIG. 1 is a perspective of a first example of a video projector support motorized bracket according to the invention.

FIG. 1 shows a motorized bracket 10 according to the invention, supporting a video projector 12. Video projector shall mean a complete projector when this is small in size or low-power or the video head alone, the light source being remote when this is high-power, typically greater than 10,000 lumens. This bracket/projector assembly is advantageously fixed, by collars or clamps 14 integral with the base 100 of the motorized bracket, to one or more rails 18 themselves fixed, for example, to the ceiling of a scene such as a theatre. Of course, any other adequate attachment means is possible, this assembly being able to simply rest by its base 100 on a flat surface.

According to the invention and in a first embodiment, this motorized bracket intended to receive, in a support frame 102, the video projector 12 comprises two arms 104, 106 in an "L" shape each having a first and a second end, the first end 104A of the first arm 104 being connected to the base 100 at a first vertical axis of rotation 108 and the second end 104B of the first arm 104 being connected to the first end 106A of the second arm 106 at a second horizontal axis of rotation 110 perpendicular to the first vertical axis of rotation 108, the second end 106B of the second arm 106 being connected to the support frame 100 at a third vertical axis of rotation 112 perpendicular to the second horizontal axis of rotation 110 and coaxial (in its rest position) with the first vertical axis of rotation 108. Each rotation axis 108, 110, 112 is motorized by a motor-gear assembly 114, 116; 118, 120; 122, 124 in direct engagement with this rotation axis (also referred to as direct axis motorisation), in other words without significant pulley or belt vibration generators (jerks during accelerations or decelerations) and hysteresis (or backlash). The motors are typically stepper motors, or, for example, brushless DC motors and the reduction gears are very high precision, elliptical reduction gear, geared motor assemblies from Harmonic Drive® for example, for which the hysteresis is less than 0.5 Arcmin (i.e. 0.0083°). In addition, it is also possible to manage, by means of the motorized bracket motors (and their associated geared motor assemblies), the tilt 126, zoom 128 and focus 130 of the video projector (each illustrated in FIG. 3), as will be shown below with the description of the electrical circuit of the motorized bracket.

Figure 2:
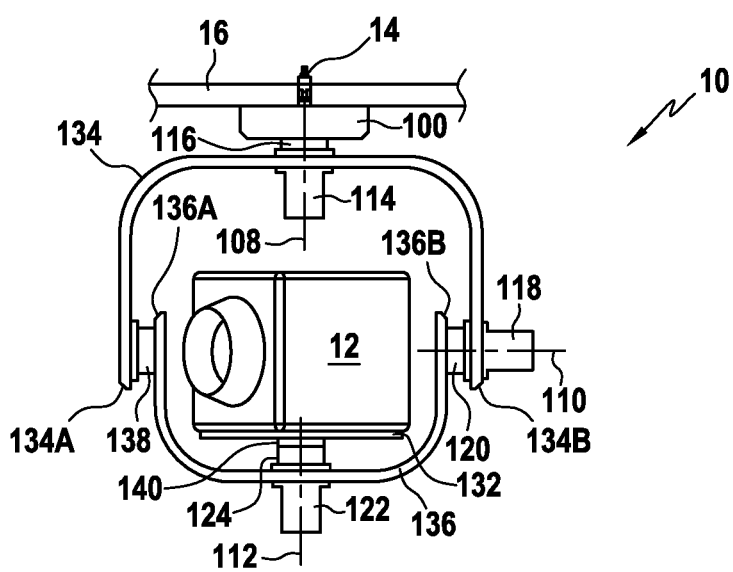
FIG. 2 is a perspective of a second example of a video projector support motorized bracket according to the invention.

FIG. 2 shows a second embodiment which differs from the first in that the support frame is limited to a single support plate 132 on which the video projector 12 is securely held and in that the two arms 134, 136 of the motorized bracket now have a "U-shaped" symmetric configuration. The first arm 134 is connected to the base 100 at the first motorized rotation axis 108 which passes through its centre, and the second arm 136 is connected to the support plate 132 at the third motorized rotation axis 112 which passes through its centre and which, in the rest position thereof, is coaxial with the first rotation axis 108, the second arm 136 being connected to the two ends 134A, 134B of the first arm 134 by its own two ends 136A, 136B, the second motorized rotation axis 110 passing through, as previously, two of these ends 134A, 136A, the two other coaxial and opposite ends 134B, 136B, being connected by a single free, in other words not motorized, rotation axis 138.

The above support structure, whether it is single arm (FIG. 1) or double arm (FIG. 2), produces a perfect mass balance with a centre of gravity which makes it possible to support large weights (from 20 to more than 100 kg) without significant lever arms and therefore ensuring a perfect mechanical servo-control without vibrations and with a placement precision for the distances to the scene of 10 to 100 m, an exceptional movement quality and repeatability. This balanced structure enables the motorized bracket to be used in any position, set on the ground, suspended or even held laterally offset.

The incorporation of at least one additional axis, compared to conventional motorized brackets with two axes, enables the management of an additional adjustment parameter which does not exist in the solutions of the prior art. Indeed, the image of a video projector has a 16/9 or even 4/3 ratio and it is therefore useful to be able to position the image in "portrait" mode as well as in "landscape" mode, which is made possible by the presence of the third motorized rotation axis 112.

Figure 3:
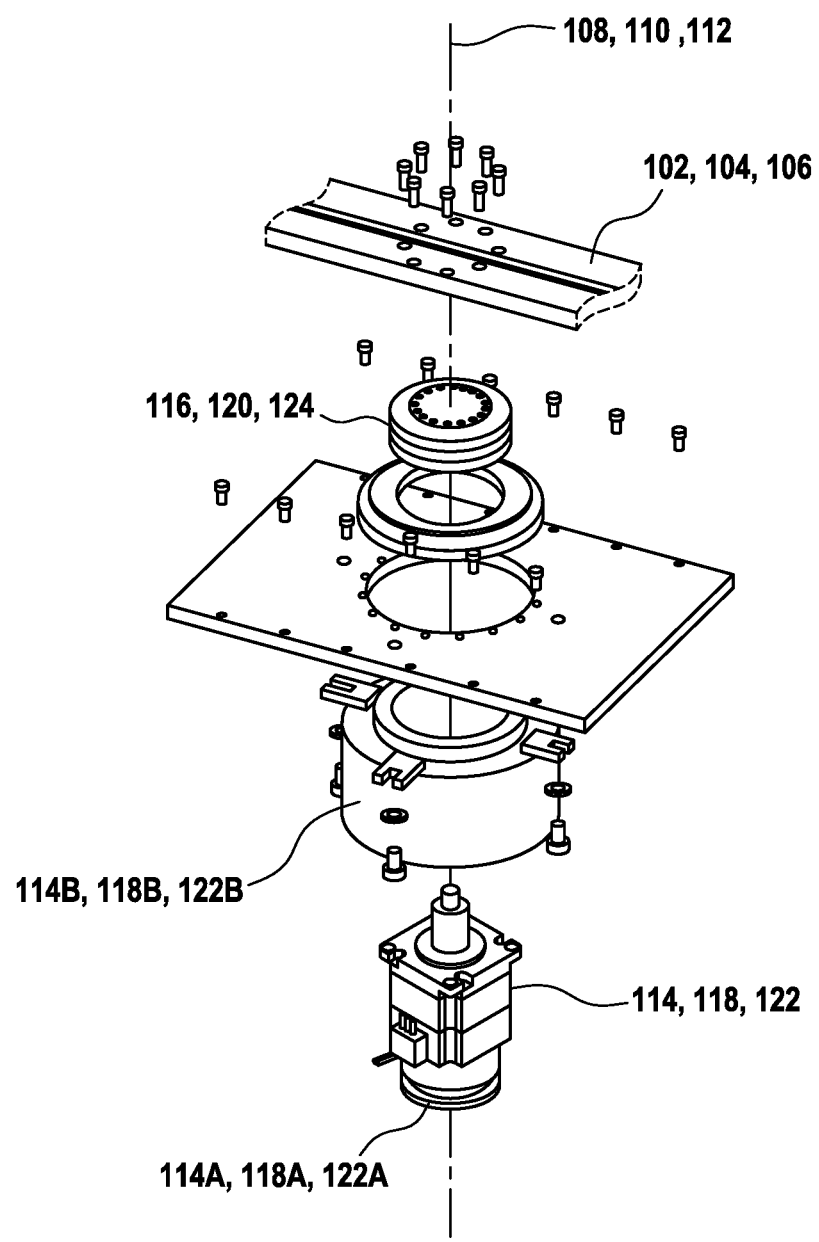
FIG. 3 is an exploded view of the motorisation of each rotation axis of the motorized bracket of FIG. 1 or 2.

FIG. 3 shows, in more detail and in the form of an exploded view, the motorisation of each rotation axis 108, 110, 112 of each motor 114, 118, 122 on the axis of which is mounted, in the rear part, an electromagnetic brake 114A, 118A, 122A and, in the forward part, an electric collector 114B, 118B, 122B encasing the motor and ensuring the passage of the power and data described above, from the static part to the mobile part, and to the support 102 or the arm 104, 106; 134, 136 driven by the geared motor assembly 116, 120, 124.

Figure 4:
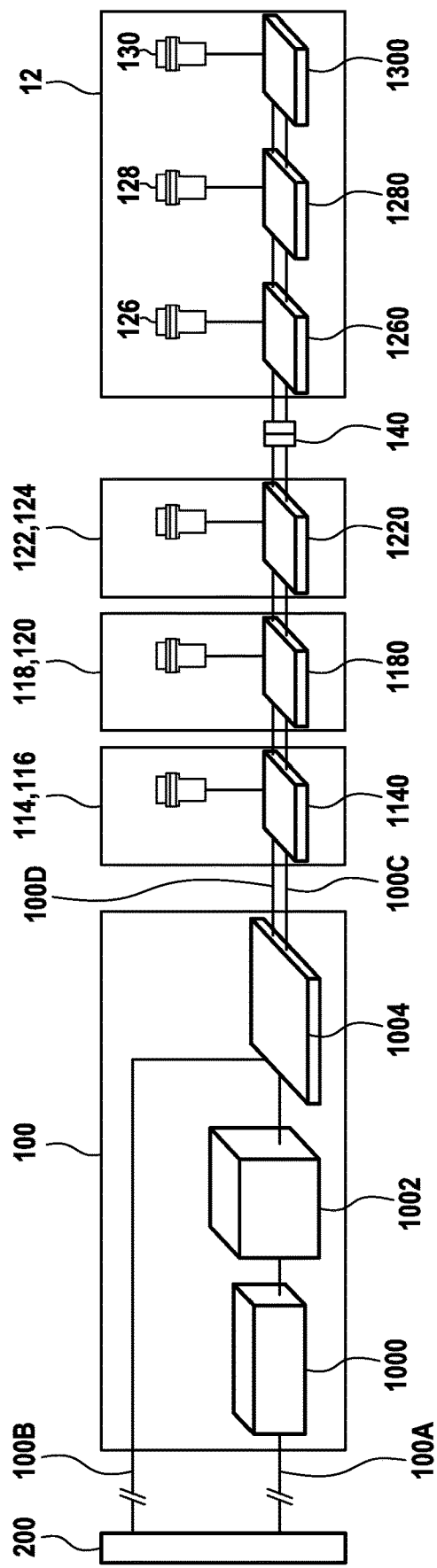
FIG. 4 shows the electric servo-control circuit of the various positions of the motorized bracket of FIG. 1 or 2.

The electric circuit providing the motorisation of the bracket is illustrated in FIG. 4. The bracket receives, in its base 100, a remote-control panel 200, for example in a control room, an AC power supply 100A and control data 100B required for moving the bracket on its various axes. This AC supply voltage, typically 110/240 Volts at 50/60 Hz, is transformed in an AC/DC converter 1000 into one or more DC voltages that are typically between 12 and 48 Volts, ensuring the charging of a battery 1002 itself delivering, according to the received voltage, a DC voltage also between 12 and 48 volts in order to power a control unit 1004 which may include a memory and furthermore directly receiving the control data 100B from the control panel 200.

The control unit 1004 delivers, on a power line 100C, the energy necessary to supply the various motors of the bracket and the projector and, on a common data line 100D, according to known communication protocols such as RS485, DMX512 or Art-Net, the position data required for controlling the rotation of the various motors of the bracket and the projector. In contrast to the brackets of the prior art where a single control card is connected in star configuration to the set of controlled motors, each of the motors of the invention has its own control card 1140, 1180, 1220, 1260, 1280, 1300 equipped with a microprocessor (typically a microcontroller of the AVR® family from Microchip Technology) locally managing the position in rotation of the associated motor according to a pre-programmed servo-control law with a predefined movement speed, movement amplitude, acceleration/deceleration curve and torque specific to each controlled motor. The connection between the bracket and the projector is made at a connector 140 enabling power and commands of its individual motors to be relayed to the projector and maintaining, between all of the motors controlled by the control unit 1004, a daisy chain in which each autonomous control card receives from the "upstream" card to which it is connected, the power and data lines, that it retransmits to the "downstream" card to which it is also connected, each control card of the motors having a code wheel for identifying a specific motor.

The control cards are configured to maintain, in all circumstances, a minimum supply voltage necessary for saving the position of each of the motors of the bracket in standby mode and when switched off, with a high permanent holding torque facilitated by the presence of the electromagnetic brake on each of the outgoing rear axes of the motors 114, 118, 122. Typically, this information is saved in the microsecond which follows the switching off of the bracket (including in the case of micro-outages) in the internal memory of the microprocessors of these cards (typically a static RAM memory, a flash memory or an electrically programmable ROM memory). This information can also be saved in the memory of the control unit 1004, when it possesses one.

The operation of the motorized bracket is now explained with regard to FIGS. 5 to 10, which show the different movements of said bracket about its motorized rotation axes.

Figure 5:
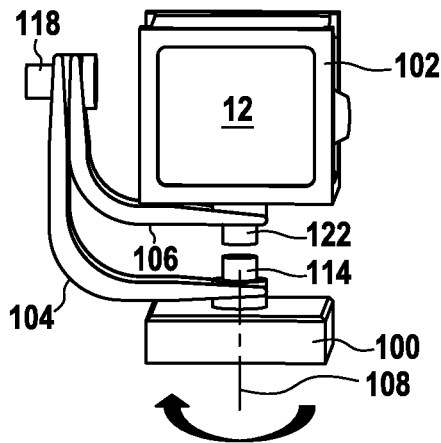
FIG. 5 illustrates, in a first position, the movement of the motorized bracket of FIG. 1 about a first axis of rotation.
Figure 6:
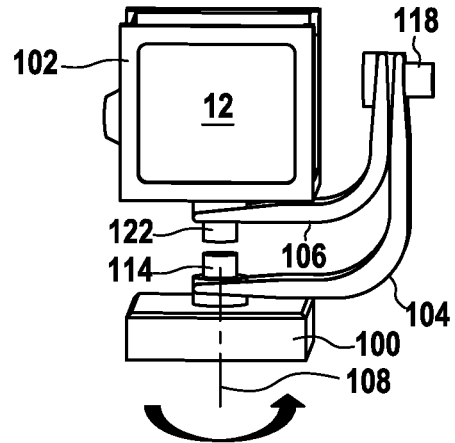
FIG. 6 illustrates, in a second position opposite the first, the movement of the motorized bracket of FIG. 1 about the first axis of rotation.

FIGS. 5 and 6 show, in two opposite positions, the rotation about the first motorized vertical rotation axis 108. This rotation corresponds to the rotation of the projector on its horizontal axis ("Pan" axis of the projector). This rotation can be carried out over 360° but, in practice, it is limited to a movement range of 200° between −100° and +100° in order to allow the passage of optical fibre cables when the video projector comprises light sources remote from the video projection head comprising the lens.

Figure 7:
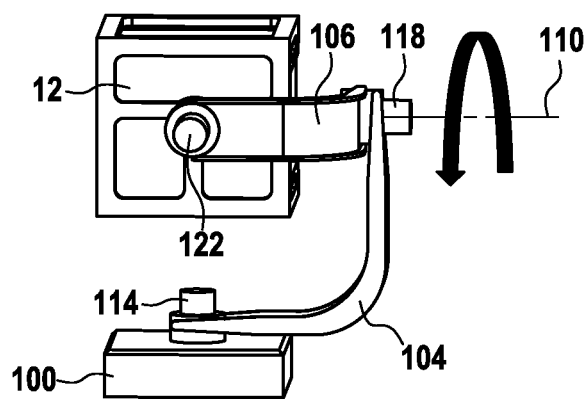
FIG. 7 illustrates, in a first position, the movement of the motorized bracket of FIG. 1 about a second axis of rotation.
Figure 8:
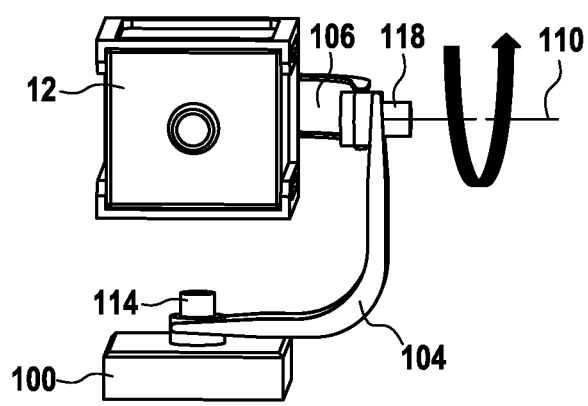
FIG. 8 illustrates, in a second position opposite the first, the movement of the motorized bracket of FIG. 1 about the second axis of rotation.

FIGS. 7 and 8 show, in two opposite positions, the rotation about the second motorized horizontal rotation axis 110. This rotation corresponds to the rotation of the projector on its vertical axis ("Tilt" axis of the projector). This rotation can be carried out over 360° but, in practice, it is limited to a movement range of 200° between −100° and +100° in order to allow the passage of optical fibre cables when the video projector comprises light sources remote from the video projection head comprising the lens.

Figure 9:
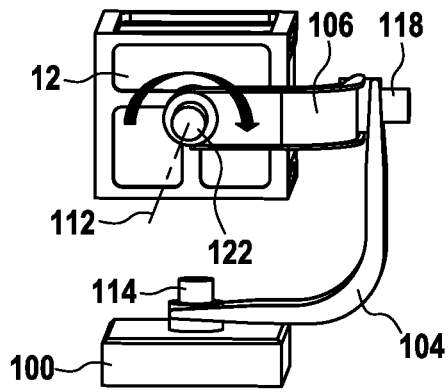
FIG. 9 illustrates, in a first position, the movement of the motorized bracket of FIG. 1 about a third axis of rotation.
Figure 10:
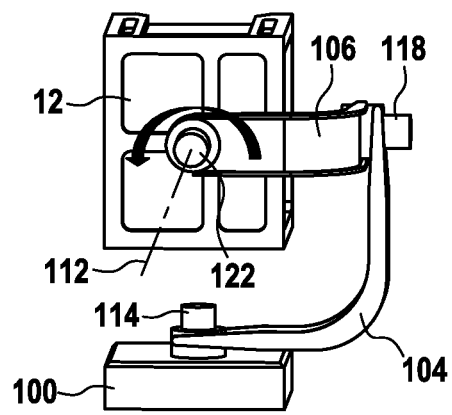
FIG. 10 illustrates, in a second position, the movement of the motorized bracket of FIG. 1 about the third axis of rotation.

FIGS. 9 and 10 show, in two opposite positions, the rotation about the third motorized vertical rotation axis 112. This rotation corresponds to the rotation of the projector on itself ("Pan-roll" axis of the projector). This rotation can be carried out over 360° but, in practice, it is limited to a movement range of 100° between −50° and +50°, sufficient to allow the positioning of the video projector in "landscape" mode (FIG. 9) or in "portrait" mode (FIG. 10).

The invention provides a high-performance bracket, both technically in terms of the quality of movements during movements of view, as well as economically to ensure, if necessary, the only positioning of inaccessible projectors.

Of course, although, in the illustrated example, reference has essentially been made to a video projector, it is obvious that such a motorized bracket can be used with a fixed or moving image projector.

The invention claimed is:

1. A motorized bracket intended to receive, in a support, a video projector and having a base, a first arm and a second arm, wherein the first arm is connected to the base at a first motorized rotation axis, the second arm being connected to the first arm at a second motorized rotation axis and the second arm is connected to the support at a third motorized rotation axis, each motorized rotation axis consisting of a motor coupled to a geared motor assembly in direct engagement with the arm or the support that is to be controlled;

wherein each motor comprises its own control card equipped with a microprocessor or microcontroller locally managing rotational position data of the associated motor received on a common data line, according to its own preprogrammed servo-control law, each control card having a code wheel allowing a specific motor to be identified.

2. The motorized bracket according to claim 1, wherein the motors are stepper motors or brushless DC motors and the geared motor assemblies in direct engagement are elliptical reduction gears with very low hysteresis, less than 0.5 Arcmin.

3. The motorized bracket according to claim 1, wherein the first and second arms have an "L" shape or a "U" shape.

4. The motorized bracket according to claim 3 and in which the first and second arms have a "U" shape, wherein the first and second arms are connected via a single free rotation axis that is coaxial with the second motorized rotation axis.

5. The motorized bracket according to claim 1, wherein the support comprises an electrical connector intended to be connected to the video projector in order to ensure supply of power and the control of motors of the video projector from a control unit included with the base and according to a daisy chain.

6. The motorized bracket according to claim 5, wherein the base comprises an AC/DC converter and a battery delivering, on a power line, energy necessary for the power supply of the various motors of the bracket and of the video projector; and wherein the control unit delivers, on the common data line, position data required in order to control the rotation of the various motors of the bracket and of the video projector.

7. The motorized bracket according to claim 6, wherein each of the control cards is configured to maintain from the battery and in all circumstances, a minimum supply voltage necessary for saving the position of each of the motors of the bracket, in standby mode and when switched off.

8. The motorized bracket according to claim 1, wherein the microprocessor or microcontroller has a static RAM memory, flash memory or electrically programmable ROM memory.

9. An assembly comprising a video projector and a motorized bracket according to claim 1.

10. The motorized bracket according to claim 1, wherein the preprogrammed servo-control law defines predefined movement speed, movement amplitude, acceleration/deceleration curve, and torque specific to each motor.

* * * * *